United States Patent [19]

Katzenstein

[11] Patent Number: 4,513,188

[45] Date of Patent: Apr. 23, 1985

[54] SYSTEM AND METHOD FOR IMPACT WELDING BY MAGNETIC IMPLOSION

[76] Inventor: Jack Katzenstein, 855 Haverford Rd., Ramona, Calif. 92065

[21] Appl. No.: 312,964

[22] Filed: Oct. 20, 1981

[51] Int. Cl.³ .......................... H05B 5/00; H05B 6/00
[52] U.S. Cl. .................... 219/9.5; 219/10.41; 228/107
[58] Field of Search ............... 219/7.5, 9.5, 10.41; 228/107; 72/56

[56] References Cited

U.S. PATENT DOCUMENTS

| | | | |
|---|---|---|---|
| 2,976,907 | 3/1961 | Harvey et al. | 72/56 |
| 3,195,335 | 7/1965 | Brower et al. | 72/56 |
| 3,258,573 | 6/1966 | Morin et al. | 219/7.5 X |
| 3,794,805 | 2/1974 | Rudd | 219/7.5 X |
| 4,144,433 | 3/1979 | Zelahy et al. | 219/9.5 |

Primary Examiner—Roy N. Envall, Jr.
Assistant Examiner—M. M. Lateef
Attorney, Agent, or Firm—Herzig, Schaap & Yanny

[57] ABSTRACT

A system for impact welding using an electrical coil producing a magnetic field of sufficiently high-intensity to impel a ballistic workpiece into a separate stationary workpiece for producing a weld therein. The pressure on the ballistic workpiece resulting from the magnetic repulsion between the ballistic workpiece and the coil results in the ballistic workpiece being propelled towards the stationary workpiece at sufficient velocity to form a weld. Parameters are provided for varying the voltage and inductance of the capacitor bank for particular driving coil and ballistic workpiece dimensions to obtain matching of the impedances of the capacitor and coil arrangement to the particular ballistic workpiece. The impedance matching maximizes the conversion of electrical energy in the bank to kinetic energy of the workpiece.

13 Claims, 11 Drawing Figures

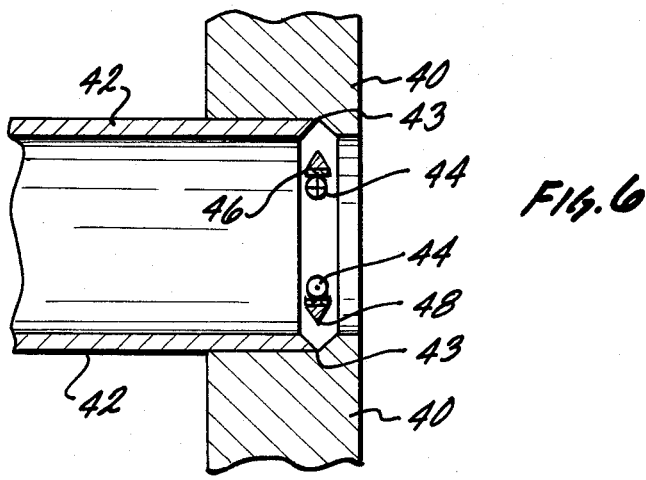
Fig. 6
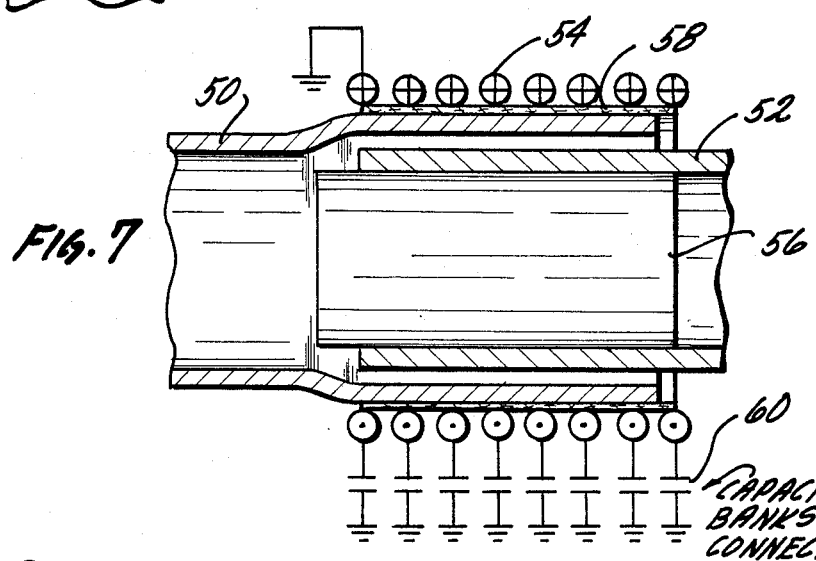
Fig. 7
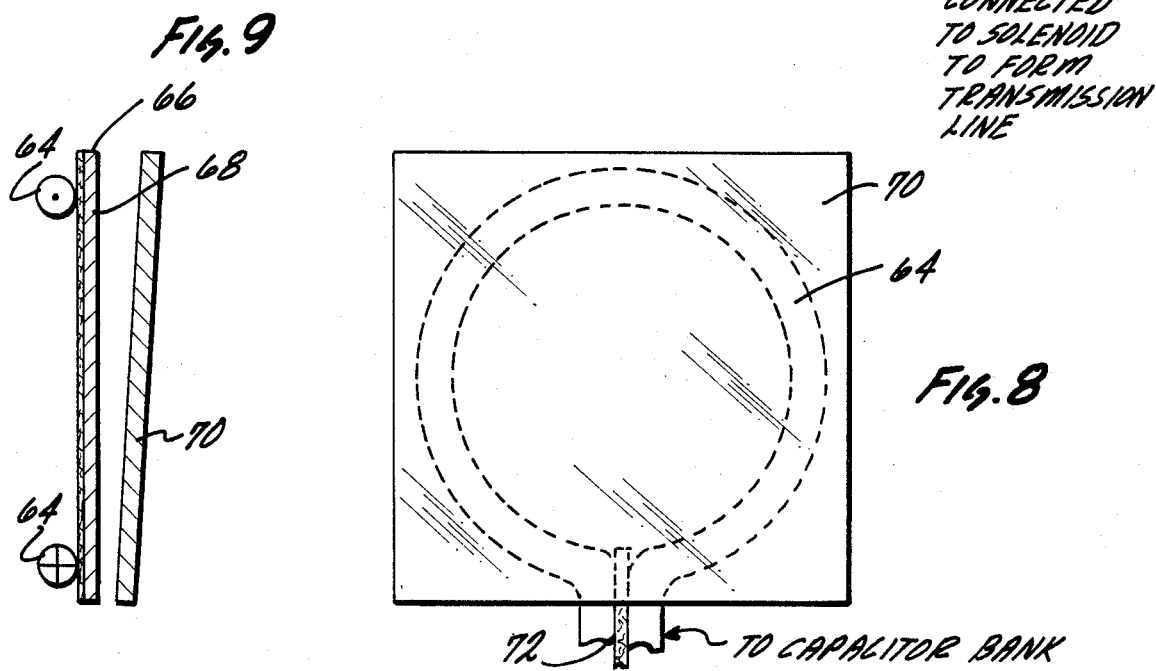
Fig. 9
Fig. 8

SYSTEM AND METHOD FOR IMPACT WELDING BY MAGNETIC IMPLOSION

BACKGROUND OF THE INVENTION

1. Field of the Invention

The invention pertains to systems and methods for impact welding by magnetic implosion.

2. Description of the Prior Art

Impact welding is a known technique. By this method, a ballistic work piece is caused to collide at a velocity of 350 meters per second and an angle of 8-12 degrees with a part or parts to be welded. The joinder is apparently the result of a jetting action between the colliding surfaces which is such that it cleans the surfaces, thus providing the capability of a joinder through the well-known interaction of smooth and clean surfaces. In many applications, impact welding is accomplished through the technique known as explosive welding, whereby the appropriate collision velocity is attained by means of a chemical explosion which hurls the ballistic work piece against the parts to be joined. This technique is used in various applications, such as pipe welding and the like; however, it has obvious disadvantages in its requirement of high skill on the part of the welder, its inescapable hazard, and the noise produced by the technique, among other disadvantages.

Other methods have been utilized in order to achieve the required collision velocity and angle for impact welding. Among these is the use of magnetic implosion to thrust the ballistic work piece against the work piece to be welded. Under this technique, a plurality of wires, known as a driving coil, are affixed to the ballistic work piece and are connected to a power source, such as a capacitor bank. The required collision velocity is achieved by means of a magnetic implosion which results from a surge of current through the power source which causes implosion through the mutual repulsion of the work piece and the components of the driving coil. This technique has been used in particular to weld the ends of nuclear fuel rods, and has also found application in other contexts in which the diameters of the parts to be joined are small. Extension of this technique of magnetic implosion to parts of larger dimensions has proved unfeasible because of the inefficiency of power utilization therein. Investigation has disclosed that normally less than one percent of the power provided by the power source is actually utilized in producing the magnetic implosion. For this reason, the size of the capacitor bank would increase quadratically, according to investigation, with an increase in the diameter of the parts to be joined and, consequently, of the ballistic work piece. The increase in size and electrical requirements of the power source with increasing size of the work piece and ballistic work piece is such that application of the technique of impact welding by magnetic implosion has been limited to contexts in which the diameters of the ballistic work piece and work piece are relatively small, as in the example of nuclear fuel rods. Specific examples of existing apparatus and methods relating to impact welding by magnetic implosion are U.S. Pat. Nos. 2,976,901 and 3,195,335, together with an article appearing the Journal of Applied Physics, Volume 50, November, 1979, No. 11, Part 2, entitled, "Measurements of a 70 T Pulsed Magnetic System with Long Operational Life."

Therefore, there has been a felt but unfulfilled need for a system and method for accomplishing impact welding by magnetic implosion operating at efficiencies such that such welding may be applied to work pieces of substantial diameter, such as those found in oil pipelines.

SUMMARY OF THE INVENTION

A system and method for impact welding by magnetic implosion comprises a ballistic work piece member for impulsion to collide at welding velocity with a stationary work piece, driving coil means disposed around the stationary work piece and the ballistic work piece and connected to a power source so that upon energization of the driving coil means by the power source, the driving coil means will implode and impel the ballistic work piece to welding velocity against the stationary work piece, the driving coil means being configured such that the coupling parameter of the driving coil means with the power source is maximized.

Applications of the invention include a configuration for butt welding substantially flat plates comprising ballistic work piece members in the form of substantially flat plates disposed around a stationary work piece to be welded and driving coil means disposed adjacent the ballistic work pieces, the driving coil means forming a cylindrical coil and being connected to a power source, the driving coil means being configured to maximize efficiency by maximizing the coefficient coupling thereof with the power source.

A further application of the system is to pipe welding wherein the system comprises a ballistic work piece member in the form of a ring disposed about a work piece to be welded and driving coil means in the form of a ring disposed upon the ballistic work piece, the driving coil means being connectable to a power source and being configured to optimize efficiency relative to power consumption by maximizing the coefficient of coupling between the power source and the driving coil means.

A further application of the invention is to welding heat exchanger tubes and tube sheets wherein the system comprises a ballistic work piece member disposed in connection with a chamfered intersection between a heat exchanger tube and a heat exchanger tube sheet, and driving coil means disposed adjacent the ballistic work piece and connectable to a power source, the driving coil having the coefficient of coupling with the power source to maximize efficiency of power utilization therefrom.

A further application of the invention is to lap welding cylindrical cladding of pipes, wherein the invention comprises driving coil means disposed adjacent an enlarged section of pipe to be thrust against a section of pipe disposed within the enlarged section, the driving coil means being in the form of a solenoid and being connectable to a power source in the form of capacitor banks to form a transmission line, the driving coil means having a coefficient of coupling with the power source to maximize efficiency and utilization of energy from the power source.

An additional application of the invention is for plane cladding wherein the invention comprises a ballistic work piece member in the form of a flyer plate member disposed adjacent a parent plate member to be clad, and driving coil means disposed adjacent the flyer plate member and connectable to a power source in the form of capacitance means with the driving coil means being positioned to thrust the flyer plate member at welding velocity against the parent plate member upon energization of the driving coil means by the capacitance means and having a coefficient of coupling with the capacitance means to maximize efficiency of energy transfer therefrom.

A method maximizing efficiency of impact welding by magnetic implosion comprises the steps of providing a ballistic work piece, providing driving coil means disposed adjacent the ballistic work piece and connected to a power source, and configuring the driving coil means such that the coefficient of coupling with the power source maximizes efficiency of energy utilization.

BRIEF DESCRIPTION OF THE DRAWINGS

FIG. 6 is a side elevation in accordance with the invention having a configuration of a driving coil and ballistic work piece for application to welding tubes into a tube sheet to form a heat exchanger;

FIG. 7 is a front view, somewhat simplified, of a system in accordance with the invention having a configuration for cylindrical cladding or lap forming;

FIG. 8 is a front view of a system in accordance with the invention having a configuration for plane cladding or impact forming;

FIG. 9 depicts the system of FIG. 8 in section along the line 9—9;

DETAILED DESCRIPTION OF THE INVENTION

Figure 2:
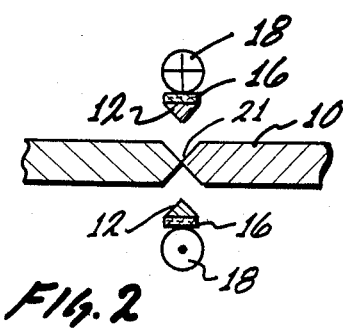
FIG. 2 is a section through the line 2—2 of FIG. 1.
Figure 1:
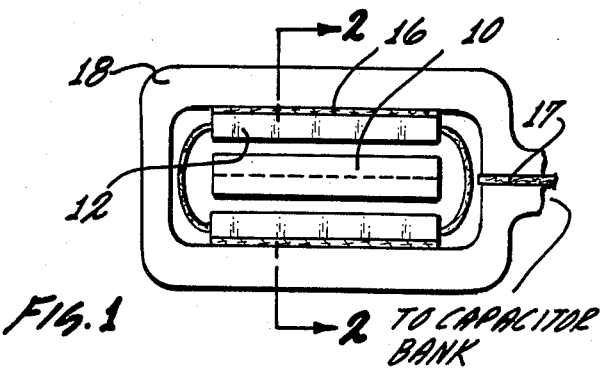
FIG. 1 depicts a system for impact welding by magnetic implosion configured for application to butt welding flat plates, in elevation view.

Referring to FIGS. 1 and 2, involving butt welding of flat plates, a work piece 10 comprises a flat plate. A ballistic work piece 12 in the form of a pair of suitably shaped bars is positioned symmetrically about the work piece 10. An electrical insulator 16 is disposed upon ballistic work piece 12. A driving coil 18 is positioned upon the electrical insulator 16, which may be of rubber or similar material. The insulator 16 is necessary to prevent a short circuit through the ballistic work piece. For ballistic work pieces at low electrical conductivity, a conducting pusher plate between the insulator and the work piece is desirable to minimize intrusion of magnetic flux lines into the ballistic work piece, which would diminish the effectiveness of the magnetic implosion welding which is accomplished by the invention. The driving coil 18 comprises a plurality of turns of electrical wire connected to a capacitor bank, or other power source (not shown). In order to maximize effectiveness of energy utilization of the power source with respect to the magnetic implosion resulting from power therefrom, it is necessary in accordance with the invention to configure the parameters of the respective elements of the system in accordance with the invention. The calculation given below refers to the invention generally and is generally applicable; the specific form of the equations which applies to the particular case depicted in FIGS. 4 and 5 will also be given.

The calculation for coupling the characteristics of the power source and of the driving coil basically consists of a procedure for the stepwise integration of two coupled, non-linear ordinary differential equations. These equations comprise an equation of motion and a circuit equation.

The equation of motion and the circuit equation are, respectively, given as Equations (1) and (2) hereinbelow:

$$m \frac{d^2R}{dt} = \frac{1}{2} \frac{\partial L(R)}{\partial R} I^2(t) \tag{1}$$

$$\frac{d}{dt}(L(r)I(t)) = V_o - \frac{1}{C} \int_0^t I(t')dt' \tag{2}$$

In Equations (1) and (2), R is the radial coordinate of the work piece, m is the mass of the work piece, I(t) is the instantaneous value of the current in the driving coil, C is the capacitance of the capacitor bank, $V_o$ is the initial charging voltage of the bank, and L(R) is the equivalent inductance of the work piece and the driving coil which is a function of the radius of the former plus any constant parasitic inductance of the bank, switches, and current feed.

Ohmic resistance may be neglected in both the discharge circuit and the work piece; this assumption is correct where the work piece excludes the magnetic field, i.e., where the skin depth of the work piece at the actual frequency of the bank and coil is negligible compared to the thickness of the work piece. Where such an assumption is not valid, i.e., where the work piece is of a highly resistive metal, such as stainless steel, a "pusher" made of highly conductive material, such as copper or aluminum, must be employed. Such a pusher may be used in all applications of interest when the conductivity of the work piece is insufficient to provide complete flux exclusion. The inductance L(R) can be written as the sum of a parasitic term constant in time and an active term which depends upon the radial coordinate R of the work piece and through it upon the time as follows:

$$L(R) = L_P + L'(R) \tag{3}$$

$L'(R)$ depends on the self-inductances $L_o$ of the driving coil and $L'(R)$ of the work piece and M(R), the mutual inductance of the driving coil and the work piece. Only the last two quantities are taken to be variable, the coil being assumed to be sufficiently rigid that $L_o$ is constant.

Applying elementary circuit theory, the relationship among the quantities in Equation (3) in the absence of Ohmic loss in the work piece can be written as:

$$L'(R) = \left(L_o - \frac{M^2(R)}{L_1(R)}\right) = L_o\left(1 - \frac{M^2(R)}{L_o L_1(R)}\right) \tag{4}$$

Recognizing the quantity:

$$K = \frac{M(R)}{(L_o L_1(R))^{\frac{1}{2}}} \tag{4a}$$

as the co-efficient of coupling between coupled circuits, then Equation (4) becomes:

$$L'(R) = L_o(1 - K^2) \tag{5}$$

Equations (1) and (2) may be placed in convenient, dimensionless form employing the following definitions and equations:
 (a) length = $R_o$ = radius of the driving coil.
 (b) time =

$$t_o = \sqrt{L_o C} = \frac{4}{\pi}$$

times the quarter cycle natural period of the condenser bank and driving coil in the absence of the work piece and parasitic inductance.
 (c) current $$I_o = V_o \sqrt{\frac{C}{L_o}}$$

= peak current of the bank discharging into the coil in the absence of the work piece neglecting ohmic resistance and parasitic inductance.
 (d) voltage = $V_o$ = initial charging voltage of bank.
 (e) capacitance = C = capacitance of bank.

From the above definitions and equations, the following units are derived:

$$\text{velocity } v_o = \frac{R_o}{t_o} = \frac{R_o}{\sqrt{L_o C}} \tag{1}$$

(2) energy = $W_o = \frac{1}{2} CV_o$ = the initial energy of the bank.

Using this system of natural units, the following dimensionless variables can be defined:

$$x = \frac{R}{R_o} \; ; \; \tau = \frac{t}{\sqrt{L_o C}} \; ; \; i = \frac{I}{I_o} = I\left(V_o \sqrt{\frac{C}{L}}\right)^{-1} \tag{6}$$

The following dimensionless parameters may also be derived:

$$A = \frac{L_o (CV_o)}{2R_o^2 M} \; ; \; B = \frac{L_p}{L_o} \tag{7}$$

Equations (1) and (2) take the following dimensionless form using Equations (4) and (5).

$$\frac{d^2 x}{d\tau^2} = -A \frac{d(K^2)}{dx} i^2 \tag{8}$$

$$[B + (1 - K^2)] \frac{di}{d\tau} - \frac{d(K)}{dx} \dot{x} i = 1 - \int i(\tau') d\tau'$$

The quantity K is itself dimensionless.

The calculations of $K^2$ in general, though straightforward, requires numerical methods for arbitrary geometries of the driving coil and the work piece. For purposes of illustration, and relating to FIGS. 1-3, the example will be calculated wherein an analytic calculation is possible of $K^2$ and applicable to a cylindrical coil and work piece whose lengths, l, are large in comparison with their diameters. In this specific case, $L_o$ and $K^2$ are obtained by elementary calculation to be:

$$L_o = \frac{\pi \mu_o R_o^2}{l} \quad K^2 = \left(\frac{R}{R_o}\right)^2 = x^2 \tag{9}$$

The coupling parameter A is then given by:

$$A = \frac{\tau \mu_o (CV_o)^2}{lm} \tag{10}$$

Equation (8) thus becomes:

$$\frac{d^2 x}{d\tau^2} = -Axi^2 \tag{11}$$

$$[B + (1 - x^2)] \frac{di}{d\tau} - 2x\dot{x}i = 1 - \int i(\tau') d\tau'$$

Equation (11) can be integrated numerically from an initial value of $x_f = 1$ to various final radii, where $x_f = R_f/R_o$, $R_f$ being defined as the final radius of the driving coil after the implosion. The numerical integration of Equation (11) can proceed from the said initial value of $x_f$ and various final radii and various values of the parameters A and B. The final velocity $\dot{x}_f$ and the efficiency $\eta$ can be calculated. $\eta$ is the ratio of the final kinetic energy of the work piece to the electrical energy stored in the capacitor bank. In terms of the dimensionless variables given above, $\eta$ is given by:

$$\eta = \frac{\dot{x}_f^2}{A} \tag{12}$$

Figure 3:
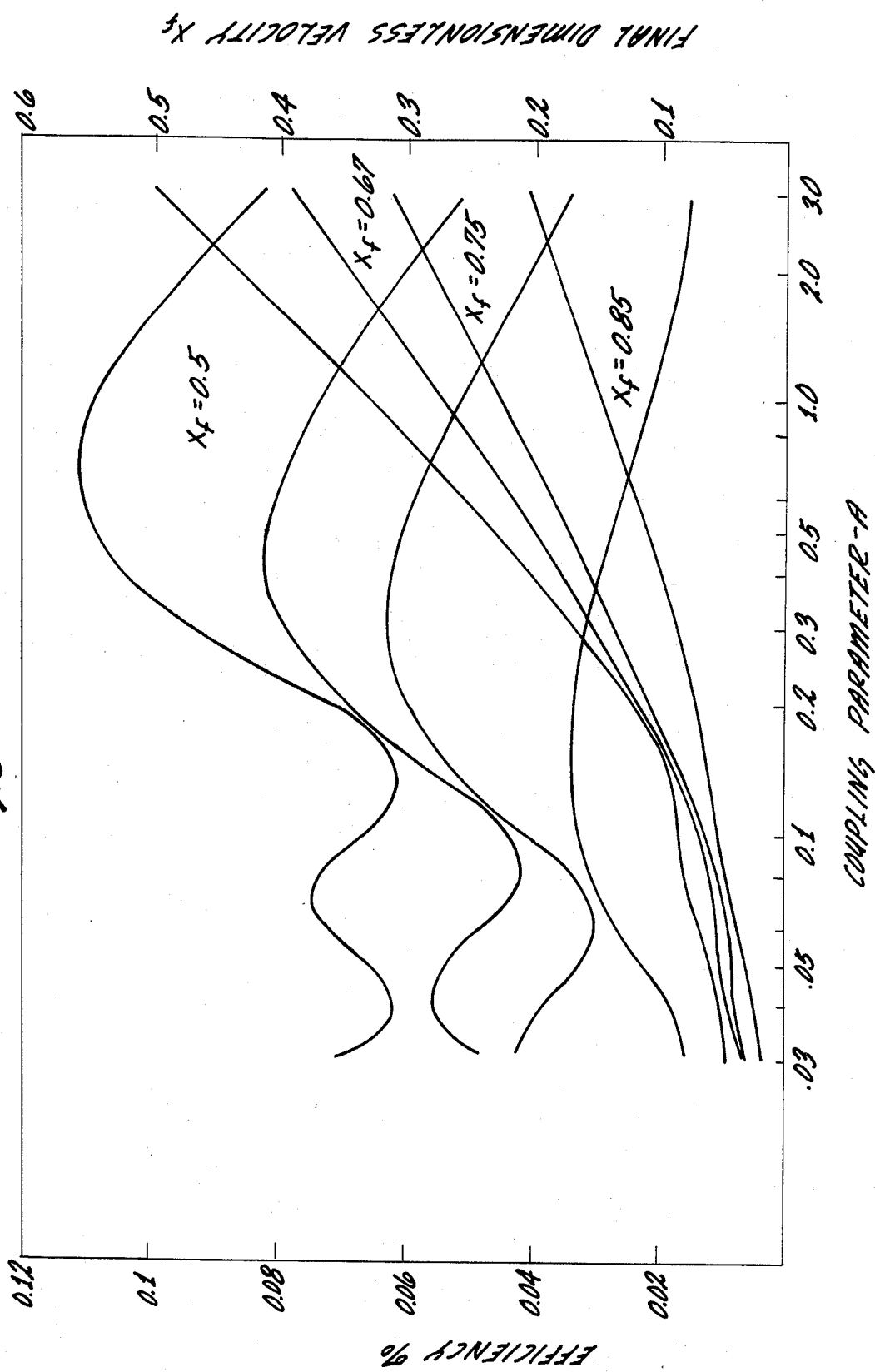
FIG. 3 is a graphical depiction of maximization of the coupling parameter A in the system depicted in FIGS. 4 and 5.

FIG. 3 depicts a plot of $\eta$ vs. A for various values of $x_f$; a value of B of 4.377 was chosen as a value appropriate to existing equipment used presently for end closure welds and is fairly typical of this type of equipment. The graphical depiction in FIG. 1 discloses that the efficiency $\eta$ attains a maximum as a function of A. This maximum efficiency and value of A corresponding to it vary with final radius $x_f$ and the efficiency increases as the cut-off radius is reduced. It is apparent from the foregoing that efficiency can be maximized and thus the size of the bank necessary to accelerate a given work piece to the impact welding velocity can be minimized by matching the characteristics of the work piece to those of the capacitor bank or power source through the choice of $A_{max}$ for a given $x_f$.

The work piece 10 in FIGS. 1 and 2 includes a chamfered section above which the driving coil and associated equipment are disposed so that upon implosion, the ballistic work piece welds the pipe 12 and fills in the chamfered portions thereof.

Flexible electrical insulators 16 are connected to the ballistic work piece 12 and an electrical insulator 17 prevents short circuiting of the driving coil 18.

Figure 5:
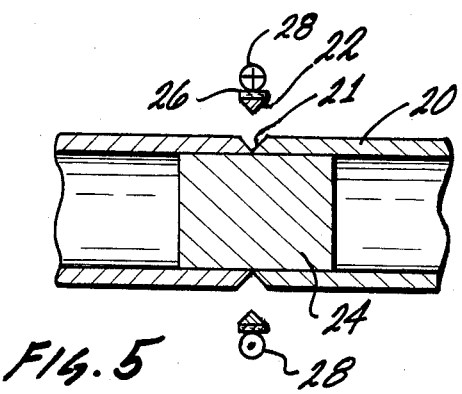
FIG. 5 is a section through the system of FIG. 4 along the line 5—5.
Figure 4:
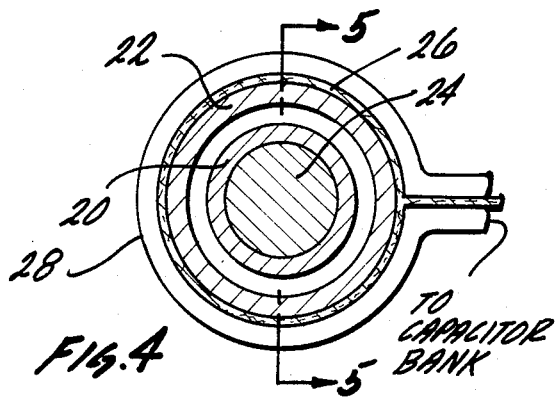
FIG. 4 is an elevation view of a system in accordance with the invention configured for application to pipe welding or cylindrical cladding.

Referring to FIGS. 4 and 5, this depicts the situation of a ring-shaped driving coil driving a ring-shaped work piece. This applies to the situation which would occur in connection with impact welding of pipe and other cylindrical pieces. The arrangement comprises a work piece 20 in the form of a pipe such as that employed in connection with oil pipelines. The work piece 20 includes chamfers 21 that are of the conventional 60–90 degree type employed in conventional fusion welding.

Arrayed around the chamfers 21 and positioned accurately with respect to concentricity and actual alignment of the chamfer is a driving coil 28. The driving coil 28 is of ring-shaped configuration. A ballistic work piece 22 is disposed above and in alignment with the chamfers 21. The ballistic work piece 22 comprises a ring of the same material as the pipe 20 and exceeds the pipe 20 in diameter by a certain amount which will determine $x_f$ in the implosion process. The minor cross-section of the work piece 28 will be configured that when the work piece 28 reaches the impact radius, it will have assumed the cross-section of the chamfer 21 with approximately an angle of 5–8 degrees between the ballistic work piece and the stationary work piece 20. Thus, upon colliding with the pipe 20, the ring 28 will provide an impact weld with a chamfer 21 and will supply the fill metal of this weld. A mandrel 24 may be required in some applications to be inserted into the pipe 20 to prevent constriction or buckling in the pipe unless the pipe is extremely massive and rigid.

Analytic expressions may be obtained for the significant parameters which arise with respect to the application in FIGS. 4 and 5. The driving coil 28, which rests upon an electrical insulator 26, should be within a magnetic potential well, which can be realized either with a single coil having a suitable profile or by two ring-shaped coils closely spaced. In the calculations which follow, the case of two simple rings is employed.

The mutual inductance between two coaxial, coplanar rings of $R_o$ and $R$ is given by:

$$M(R) = \mu_0 (RR_o)^{\frac{1}{2}} \left[ \left( \frac{2}{k} - k \right) K - \frac{2}{k} E \right] \quad (13)$$

$$k^2 = \frac{4(RR_o)}{(R + R_o)^2} \quad (14)$$

and $$K(k) = \int_0^{\frac{\pi}{2}} \frac{d\phi}{(1 - k^2 \sin^2 \phi)^{\frac{1}{2}}} \text{ and} \quad (15)$$

$$E(k) = \int_0^{\frac{\pi}{2}} (1 - k^2 \sin^2 \phi)^{\frac{1}{2}} d\phi$$

are the complete elliptic integrals of the first and second kind. The self-inductance of a ring of major radius R and minor radius r is given by:

$$L(R) = \mu_0 R \left( \ln \frac{8R}{r} - 2 \right) \quad (16)$$

for the case that applies to the arrangement in FIGS. 3 and 4, in which the current is confined to the surface of the ring.

$K^2$ can be calculated employing Equations (13) and (16), as can the values of A and $L_o$:

$$L_o = \mu_0 R_o \left( \ln \frac{8R_o}{r} - 2 \right) \quad (17)$$

$$A = \frac{\mu_0 \left( \ln \frac{8R_o}{r} - 2 \right) (CV_o)^2}{2 R_o m} \quad (18)$$

From the above equations, the co-efficient of coupling $K^2(x)$ can be obtained as a function of the dimensionless variable $x = R/R_o$, and upon inserting $K^2x$ into Equation (8), step-by-step integration can be accomplished of the equations leading to a calculation of efficiency for various cut-off radii x, coupling parameters A and inductance parameters B, as was described in the discussion in connection with FIGS. 1–3.

In this manner, the efficiency is given by:

$$\eta = \frac{x_f^2}{2A} \quad (19)$$

In the same manner as described above, the values of $x_f$ and $A_{max}$ can be calculated to optimize efficiency of the welding process. These calculations, as in the previous instance, $\eta_{max}$ takes on critical values for the parameter $A_{max}$. Using reasonable values for $x_f$, such as 0.89, 0.67 and 0.5, 0.2 for the inductance ratio B, 200 $\eta$h for $L_p$, the magnitude of efficiency is seen to be on the order of one-half, that is, approximately one-half of the energy initially stored in the power source is converted into kinetic energy of the ballistic work piece.

FIG. 6 depicts the system in accordance with the invention applied to welding tube sheets in a heat exchanger. As depicted in FIG. 6, tube sheets 40 are to be welded to heat exchanger tubes 42. Chamfers 43 are prepared between the tube sheets 40 and heat exchanger tubes 42. A driving coil 44 is arrayed concentrically and in alignment with the chamfers 43. Adjacent to the driving coil 44 is electrical insulation 46 and a ballistic work piece in the form of a ring 48. The driving coil 44 is connected to a power source (not shown), of the same type that is employed with the applications described and depicted hereinabove. Calculations of the particular parameters required to optimize efficiency for this application are carried out in the same fashion as described hereinabove.

Referring to FIG. 7, this depicts an application of the invention to lap welding of pipes or cylindrical cladding. Pipes 50, 52, to be joined, are disposed within a driving coil 54 in the form of a solenoid, pipe 52 being disposed within the large section of pipe 50. A mandrel 56 is positioned within pipe 52 to prevent buckling and constriction upon impact. The driving coil 54 is disposed on electrical insulator 58 which in turn is disposed upon pipe 50 at an enlarged section thereof, in which is disposed pipe 52. The driving coil 54 is connected to a plurality of capacitor banks 60 to form a transmission line. Welding is accomplished when the capacitor banks are energized and power is transmitted to the driving coil 54. Once again, optimization of the efficiency of power utilization is achived by maximizing the coupling parameter A in the manner described hereinabove.

Referring to FIGS. 8 and 9, these depict the invention arranged for the application for accelerating a flat metal plate for plane cladding or impact forming. A driving coil 64 is disposed upon electrical insulation 66 which in turn is disposed upon a ballistic work piece in the form of a metal flyer plate 68. The stationary work piece is in the form of a plate or die 70. The driving coil is circular and is connected to a capacitor bank (not shown); electrical insulator 72 separates the ends of the driving coil. Once again, optimization of efficiency is achieved in the manner described above by optimizing the significant parameters of the arrangement.

Figure 10:
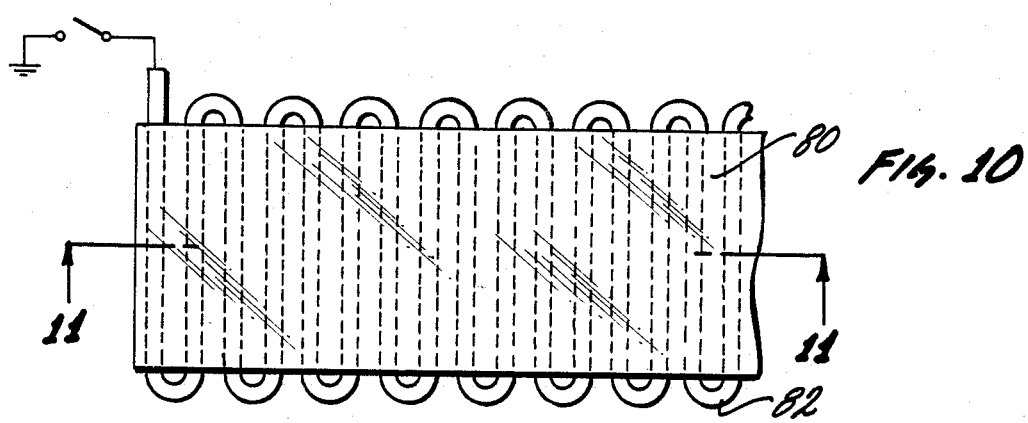
FIG. 10 is an elevation of a system in accordance with the invention having a configuration for cladding large plates.
Figure 11:
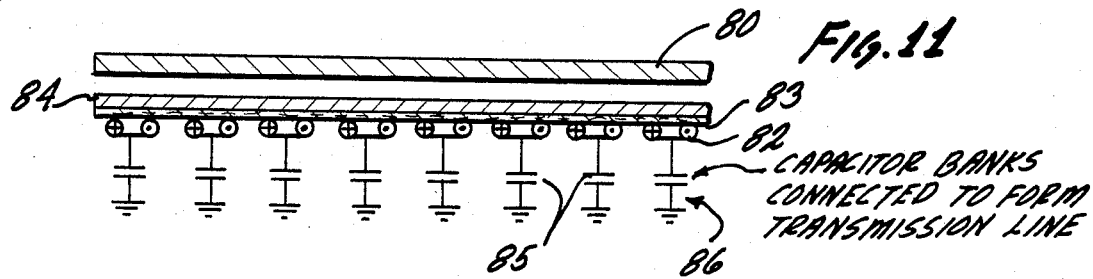
FIG. 11 is a sectional view of FIG. 10 through the line 11—11.

FIGS. 10 and 11 depict the invention as applied to context of a configuration for cladding large plates. In this application, a stationary work piece in the form of a parent plate 80 is utilized. A driving coil 82 is disposed in a "folded" form on an insulator 83, which in turn is disposed adjacent a flyer plate 84. Driving coil 82 is connected to a power source 84 in the form of a plurality of capacitors in a capacitor bank and connected to the coil 82 to form a transmission line. Upon actuation by the power source, the flyer plate is impelled to strike the parent plate 80 at welding velocity to form a bond therewith. As noted hereinabove, energy efficiency can be maximized by application of optimization techniques described above.

A method in accordance with the invention involves providing an arrangement of a stationary work piece, a ballistic work piece, and a driving coil and making the optimization calculations referred to above in order to maximize energy efficiency.

Though particular applications of the invention are described and depicted hereinabove, the invention is defined solely by the appended claims interpreted in light of the specification.

What is claimed is:

1. A system for impact welding by magnetic implosion comprising:
   a ballistic work piece member for implosion to collide at welding velocity with a stationary work piece;
   driving coil means disposed around said stationary work piece and said ballistic work piece and connected to a power source such that upon energization of said driving coil means by said power source, said driving coil means will cause said work piece to implode, propelling said ballistic work piece to welding velocity against said stationary work piece, said driving coil means being configured such that it possesses a coupling parameter selected to maximize efficiency of conversion of electrical energy of said power source to kinetic energy of said ballistic work piece, and
   an insulator mounted between said ballistic work piece member and said driving coil means to prevent passage of electrical current between said coil means and said ballistic work piece.

2. The invention as set forth in claim 1 wherein said coupling parameter is defined as follows:

$$A = \frac{L_o(CV_o)}{2R_o^2 m}$$

wherein $L_o$ is the self-inductance of the driving coil, C is the capacitance of said power source, $V_o$ is the initial charging voltage of the power source, $R_o$ is the radius of the driving coil, and m is the mass of the ballistic work piece.

3. The invention as set forth in claim 2 wherein the efficiency is given as follows:

$$= \frac{x_f^2}{2A}$$

wherein $x_f$ is equal to Rf divided by $R_o$, $R_f$ being equal to the final radius of the work piece after implosion, said efficiency being the ratio of final kinetic energy of the work piece to the electrical energy stored in the power source.

4. The invention as set forth in claim 1 further including a power source in the form of a capacitor means connected to said driving coil means.

5. A system for impact welding by magnetic implosion for application to butt welding substantially flat plates comprising:
   ballistic work piece members in the form of substantially straight bars disposed around a stationary work piece to be welded;
   a power source;
   driving coil means disposed adjacent said ballistic work pieces, said driving coil means forming an elongated rectangular coil and being configured to produce a pressure of approximately $2 \times 10^6$ to $3 \times 10^6$ psi on said ballistic members so that said ballistic members are propelled at welding velocity into said stationary work piece and to maximize efficiency by maximizing a coefficient of coupling thereof.

6. A system for impact welding by magnetic implosion applicable to pipe welding comprising:
   a ballistic work piece in the form of a ring disposed about a work piece to be welded;
   driving coil means in the form of a ring disposed upon said ballistic work piece, said driving coil means being connectable to a power source and being configured to maximize efficiency of conversion of electrical energy of said power source of kinetic energy of said ballistic work piece, by appropriate selection of a coupling paremeter of said power source and said driving coil means with said ballistic work piece; and
   an insulator mounted between said ballistic work piece member and said driving coil means to prevent passage of electrical current between said coil means and said ballistic work piece.

7. The invention as set forth in claim 6 wherein said coupling parameter is given as follows:

$$A = \frac{\mu_o(\ln 8R_o - 2)(CV_o)^2}{2 R_o m}$$

wherein r is the minor radius of the driving coil member, R is the major radius of the driving coil member $\mu_o$ is the permeability of the vacuum, C is the capacitance of the power source, $V_o$ is the initial voltage of said power source, $R_o$ is the initial major radius of the driving coil means, and m is the mass of the ballistic work piece.

8. A system for impact welding by magnetic implosion comprising:
   a ballistic work piece member disposed adjacent a stationary work piece member;
   driving coil means disposed adjacent ballistic member and a connectable to a power source in the form of capacitance means, said driving coil means being positioned to produce a pressure of approximately $2 \times 10^6$ to $3 \times 10^6$ psi on said ballistic member to thrust said ballistic member at welding velocity against said stationary member upon energization of said driving coil means by said capacitance means, said driving coil means having a coefficient of coupling with said capacitance means such that efficiency of energy transfer from said capacitance means to said driving coil means and to the implosion thereof, is maximized.

9. The system of claim 8 wherein said ballistic member prior to being thrust against said stationary member is spaced from said stationary member a distance at least approximately twice the thickness of said ballistic member in order that said ballistic member can be accelerated for a sufficient distance to attain welding velocity prior to colliding with said stationary member.

10. The system of claim 8 wherein said ballistic member is positioned to collide with said stationary member at a chamfered section thereof, the faces of said ballistic member being inclined from the faces of said chamfered section at an angle of approximately 5–8 degrees.

11. The system as set forth in claim 8 further including a mandrel, said mandrel positioned adjacent said stationary work piece member to stop movement of said ballistic work piece member at said stationary work piece member.

12. The system as set forth in claim 8 wherein said driving coil means comprises a solenoid member including capacitor means connected to form a transmission line.

13. A method for maximizing efficiency of impact welding by magnetic implosion comprising the steps of:
   (1) providing a ballistic work piece for colliding with a stationary work piece to be welded at welding velocity;
   (2) providing a driving coil means disposed adjacent said work piece member and connectable to power source, for actuation therefrom so that said driving coil produces a pressure of approximately $2 \times 10^6$ to $3 \times 10^6$ psi on said ballistic member in order to said ballistic work piece to impel the latter at welding velocity to collide with the stationary work piece; and
   (3) configuring the driving coil means such that its coefficient of coupling with said power source maximizes efficiency of energy utilization.

* * * * *